Aug. 8, 1950

C. TREE 2,517,738

TAPER BORING HEAD

Filed May 26, 1947

INVENTOR
CHARLES TREE
BY
ATTORNEYS

Aug. 8, 1950        C. TREE        2,517,738
TAPER BORING HEAD
Filed May 26, 1947        2 Sheets-Sheet 2
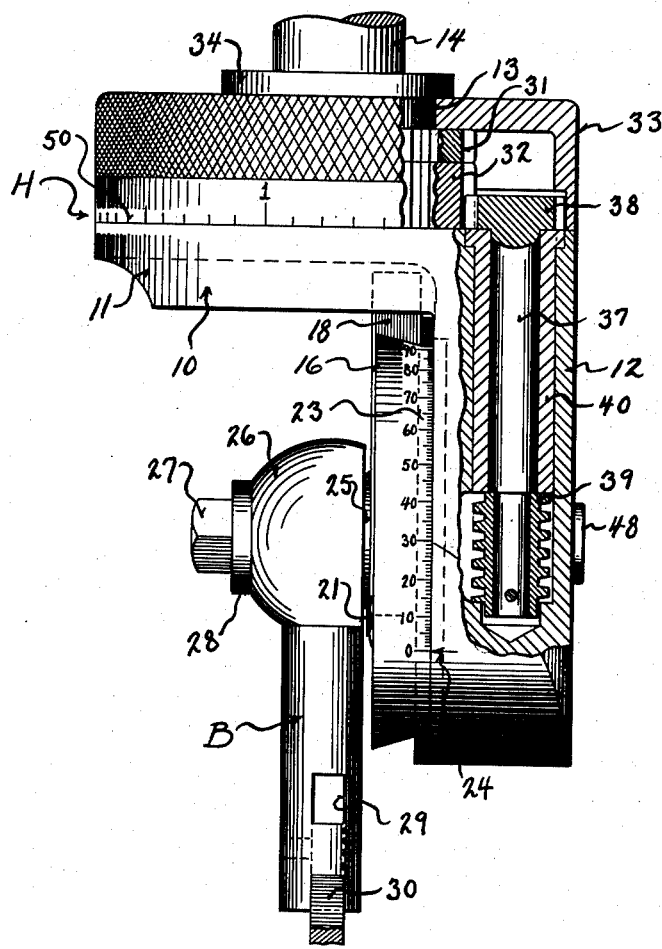
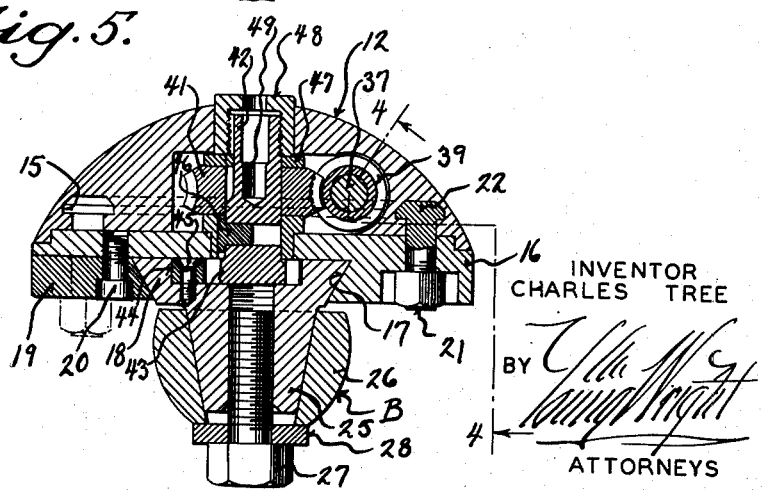
INVENTOR
CHARLES TREE
BY
ATTORNEYS Patented Aug. 8, 1950

2,517,738

UNITED STATES PATENT OFFICE 2,517,738

TAPER BORING HEAD

Charles Tree, Racine, Wis.

Application May 26, 1947, Serial No. 750,434

4 Claims. (Cl. 77—58)

This invention appertains to machine tools and more particularly to a novel taper boring head.

One of the primary objects of my invention is to provide a versatile boring head in which the boring bar and its cutting tool can be readily and accurately adjusted to any desired angle at one side of the longitudinal axis of the shank of the boring head, whereby to facilitate the accomplishment of various cutting operations such as the accurate cutting on a taper.

Another salient object of my invention is to provide novel means for mounting a tool or boring bar slide on a swivel base carried by the body of the boring head, whereby a desired angle of the boring bar on the body can be readily obtained.

A further object of my invention is to provide novel means for accurately advancing the tool or boring bar slide on the swivel base irrespective of the adjustment of said base during the rotation of the head, whereby the boring bar and its cutting tool can be moved laterally of the head to bring about the cutting of the desired taper or other operation.

A still further object of my invention is to provide a novel simple and compact boring head and mechanism for accurately adjusting the boring bar and its cutting tool longitudinally or laterally of the shank of the head.

With these and other objects in view, the invention consists in the novel construction, arrangement and formation of parts, as will be hereinafter more specifically described, claimed, and illustrated in the accompanying drawings, in which drawings:

Figure 4 is a side elevational view of the complete boring head, a part of the view being shown in section and such section being taken on the line 4—4 of Figure 5 looking in the direction of the arrows.

Figure 5 is a transverse sectional view through the boring head taken on the line 5—5 of Figure 1 looking in the direction of the arrows.

Referring to the drawings in detail, wherein similar reference characters designate corresponding parts throughout the several views the letter H generally indicates my improved boring head for supporting a boring bar B.

Figure 1:
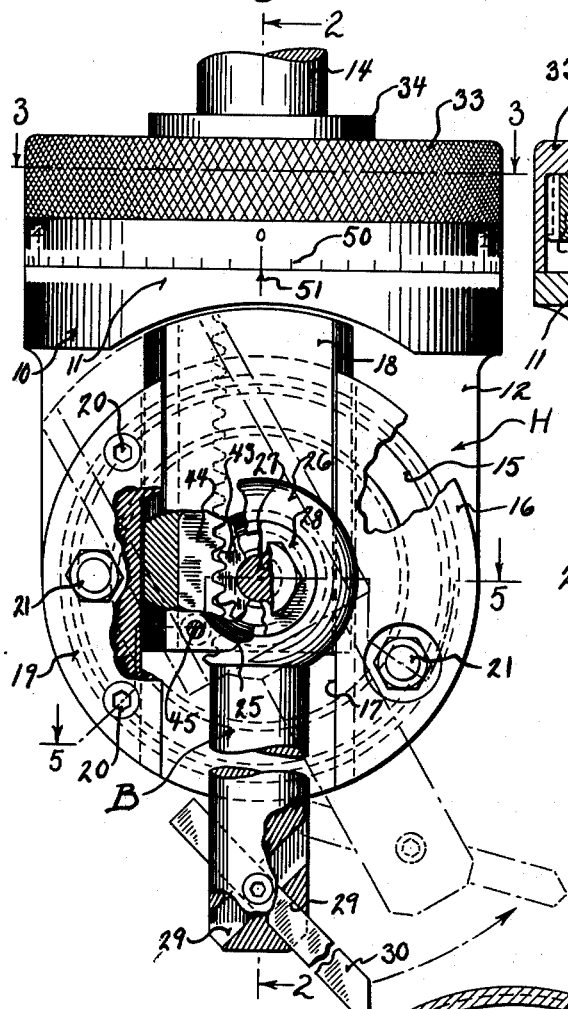
Figure 1 is a front elevational view of my improved boring head showing one adjustment of the boring bar and the swivel base in dotted lines, parts of the figure being shown broken away and in section to illustrate structural detail.
Figure 2:
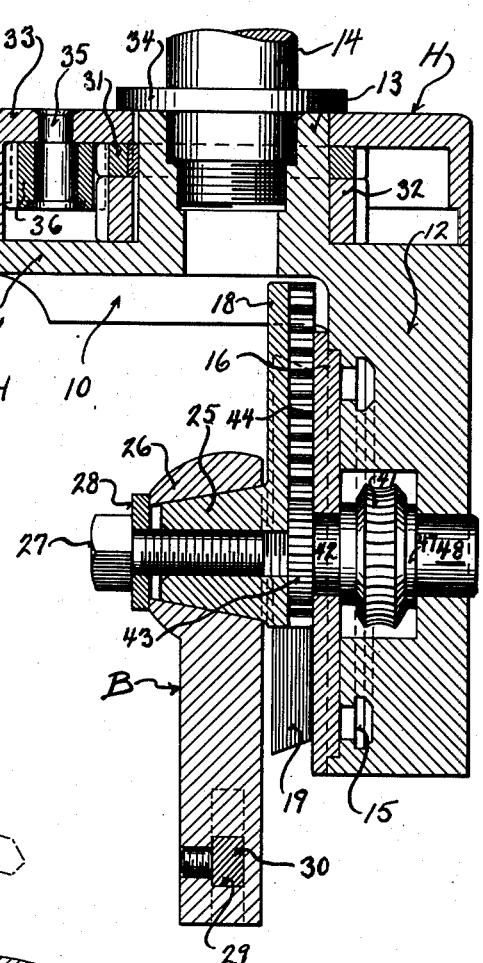
Figure 2 is a longitudinal sectional view through the boring head taken on the line 2—2 of Figure 1 looking in the direction of the arrows.
Figure 3:
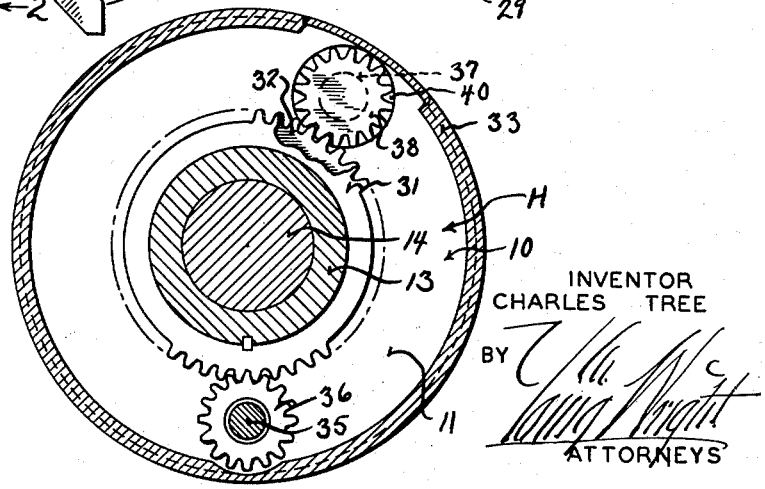
Figure 3 is a detail transverse sectional view taken on the line 3—3 of Figure 1 looking in the direction of the arrows.

The boring head H includes a body 10 having a substantially inner cylindrical portion 11 and an outer forwardly extending lateral portion 12. The axial center of the inner cylindrical portion 11 can be provided with a hub or the like 13 to which can be secured in any preferred manner the shank 14 for attachment with the machine with which the tool is used (not shown).

The inner face of the lateral forwardly extending portion 12 of the head is provided with an annular groove or guideway 15 which is of a substantial T shape in cross section. Attention is called to the fact that the portion 12 extends at one side of the longitudinal axis of the shank 14. This portion 12 of the body 10 supports the swivel base 16 which is in the nature of a circular plate. Extending diametrically across the outer face of the swivel base 16 is a dovetail guide groove 17 for slidably receiving the boring bar slide 18. The plate or swivel base 16 can be provided with a removable gib 19 for facilitating the assembly of the slide 18 with said swivel base. Set screws 20 can be employed for holding the gib in place.

The swivel base 16 carries adjustable bolts 21, the heads 22 of which can be of a T shape for sliding movement within the annular guide groove 15. By loosening the bolts 21 the swivel base can be turned on the portion 12 of the head, so that the slide 18 can be positioned at different angles relative to the longitudinal axis of the shank. To facilitate the accurate setting of the swivel base 16 the same can be provided with appropriate graduations 23. An indicating arrow 24 on the portion 12 of the head cooperates with the scale or graduations 23 for the setting of said base.

The slide 18 has formed thereon the outwardly projecting tapered boss 25 for carrying the boring bar B.

The boring bar B is of a special character in that its inner end has formed thereon an internally tapered sleeve 26 for receiving the boss. A set screw 27 is threaded axially into the boss and bears against a washer 28. The washer in turn bears against the sleeve 26 and firmly holds the boring bar in position on the slide. In all other respects the boring bar B is conventional and is provided at its forward end with sockets 29 for selectively receiving the cutting tool 30.

Great stress is laid on the means for adjusting the slide 16 and this means is so constructed and arranged that the slide can be moved diametrically across the swivel base irrespective of the adjustment of the base on the boring head. The means for adjusting the slide includes a ring spur gear 31 which is keyed or otherwise fastened to the hub 13 of the head and this hub has rotatably mounted thereon a ring spur gear 32.

Also rotatably mounted on the hub 13 is the fine adjusting and feed collar 33. The collar can be held in position by a flange 34 carried by the shank 14. The outer face of the adjusting and feed collar 33 can be knurled or roughened to facilitate the grasping thereof.

Rotatably mounted on bearing studs 35 carried by the collar are pinions 36 which mesh with the spur gears 31 and 32.

Extending longitudinally of the portion 12 of the body 10 is a shaft 37 having formed on or secured to its inner end a pinion 38. The pinion 38 meshes with the spur gear 32. Keyed or otherwise secured to the inner end of the shaft 37 is a worm 39. The pinion shaft 37 can be rotatably mounted in a suitable bushing 40 carried by the body. Meshing with the worm 39 is a worm wheel 41. The worm wheel 41 is rotatably mounted on a pinion shaft 42 and the inner end of the shaft 42 has formed thereon or secured thereto a pinion 43 which meshes with a rack bar 44. The rack bar 44 extends longitudinally of the slide 18 and is secured to the slide by machine screws 45. Keyed to the pinion shaft 42 is a bushing 46 which is rotatably mounted in the swivel head 16 at the axial center thereof. Bearing against the outer side of the worm wheel 41 is a friction washer 47 and threaded against said washer is a cap nut 48 carried by the pinion shaft. Hence by tightening the nut 48 on the pinion shaft 42 the worm wheel 41 can be held tight on said shaft against the bushing 46 for rotation with the shaft. By loosening the cap nut 48 with a polygonal wrench this same wrench can be inserted further into a polygonal opening 49 in the pinion shaft 42 so that the pinion shaft can be turned independently of the worm wheel 41 and the worm 39.

It is to be noted that the outer surface of the adjusting and feed collar 33 can be provided with graduations 50 and an indicating arrow or the like 51 can be carried by the portion 11 of the boring head body 10. Hence the amount of rotation of the adjusting collar can be readily seen.

As an example of the gear ratio for actuating the slide, the pinions 36 can be provided with sixteen teeth and the spur gear 31 with forty-three teeth and the spur gear 32 with forty-four teeth. The pinion 38 driven from the spur gear 32 can also be provided with sixteen teeth. The rack pinion 43 can be provided with twelve teeth.

Now it is to be noted that the spur gears 31 and 32 have substantially the same number of teeth and that the spur gear 32 only has a single additional tooth more than the gear 31. This brings about the desired fine adjustment of the slide 18.

When the boring head is at rest, the collar 33 can be turned and the pinions 36 rotating about the spur gears 31 and 32 will turn the spur gear 32 a certain small given distance. This in turn will move the pinion shaft 37 and the turn of the pinion shaft 37 will be transmitted to the slide 18 through worm 39, worm wheel 41, pinion shaft 42, pinion 43, and rack 44.

During rotation of the head by the machine (not shown), the adjustment and feed collar 33 can be held stationary by the hand of the operator and consequently the rotation of the spur gears 31 and 32 around the pinions 36 will bring about a steady slow rotation of the gear 32. This in turn will bring about the desired steady slow feed of the slide 16.

Obviously, if the swivel head 16 has been adjusted so that the slide 18 is at an angle to the longitudinal axis of the shank 14, then said slide will be fed forwardly and laterally.

Various changes in details can be made without departing from the spirit or the scope of my invention but what I claim as new is:

1. A machine tool head comprising a body including a substantially cylindrical portion and a forwardly extending lateral portion, an attaching shank carried by the axial center of said cylindrical portion, a swivel base plate having its inner face fitted against the inner face of the forwardly lateral projecting portion for turning movement, means securing said base plate in a selected adjusted position, a diametrically extending guideway on the outer face of said base plate, a slide in said guideway, a tool carrier connected with said slide, a rack bar on the slide, a pinion shaft rotatably carried by the forwardly projecting portion of the body extending into the axial center of the base plate, a pinion on said shaft meshing with the rack bar, a worm wheel secured to the shaft, a fine adjusting and feed collar rotatably mounted on the cylindrical portion of the body, a ring spur gear secured to the body inside the collar, a second ring spur gear rotatably mounted on the body inside of said collar, pinions carried by the collar meshing with said ring spur gears, a worm shaft rotatably carried by the forwardly projecting portion of said body, a pinion on said worm shaft meshing with the ring spur gear rotatably mounted on said body and a worm secured to the worm shaft meshing with the worm wheel.

2. A machine tool head comprising a body including a substantially cylindrical portion and a forwardly extending lateral portion, an attaching shank carried by the axial center of said cylindrical portion, a swivel base plate having its inner face fitted against the inner face of the forwardly lateral projecting portion for turning movement, means securing said base plate in a selected adjusted position, a diametrically extending guideway on the outer face of said base plate, a slide in said guideway, a tool carrier connected with said slide, a rack bar on the slide, a pinion shaft rotatably carried by the forwardly projecting portion of the body extending into the axial center of the base plate, a pinion on said shaft meshing with the rack bar, a worm wheel secured to the shaft, a fine adjusting and feed collar rotatably mounted on the cylindrical portion of the body, a ring spur gear secured to the body inside the collar, a second ring spur gear rotatably mounted on the body inside of said collar, pinions carried by the collar meshing with said ring spur gears, a worm shaft rotatably carried by the forwardly projecting portion of said body, a pinion on said worm shaft meshing with the ring spur gear rotatably mounted on said body, a worm secured to the worm shaft meshing with the worm wheel, and means for turning the rack bar pinion shaft independently of the worm and worm gear.

3. A machine tool head comprising a body including a substantially cylindrical portion and a forwardly extending lateral portion, an attaching shank carried by the axial center of said cylindrical portion, a swivel base plate having its inner face fitted against the inner face of the forwardly lateral projecting portion for turning movement, means securing said base plate in a selected adjusted position, a dimetrically extending guideway on said base plate, a slide in said guideway, a tool carrier connected with said slide, a rack bar on the slide, a pinion shaft rotatably carried by the forwardly projecting portion of the body extending into the axial center of the base plate, a pinion on said shaft meshing with the rack bar, a worm wheel secured to the shaft, a fine adjusting and feed collar rotatably mounted on the cylindrical portion of the body, a ring spur gear secured to the body inside the collar, a second ring spur gear rotatably mounted on the body inside of said collar, pinions carried by the collar meshing with said ring spur gears, said ring spur gear rotatably mounted on the body having a greater number of teeth than the ring spur gear secured to the body, a worm shaft rotatably carried by the forwardly projecting portion of said body, a pinion on said worm shaft meshing with the ring spur gear rotatably mounted on said body and a worm secured to the worm shaft meshing with the worm wheel.

4. A machine tool head comprising a body including a substantially cylindrical portion and a forwardly extending lateral portion disposed on one side of the axial center of said cylindrical portion, a swivel base plate having its inner face fitted against the inner face of the forwardly extending laterally projecting portion for turning movement, means securing said base plate in a selected adjusted position, a diametrically extending guideway on the outer face of said base plate, a slide in said guideway, a tool carrier secured to the slide, a rack bar on the slide, a pinion shaft rotatably carried by the forwardly projecting portion of the body extending into the axial center of the base plate, a pinion secured to said shaft for rotation therewith meshing with the rack bar, means for manually rotating the shaft, a worm wheel rotatably mounted on the shaft, a fine adjusting and feed collar rotatably mounted on the cylindrical portion of the body, a ring spur gear secured to the body inside of the collar, a second ring spur gear rotatably mounted on the body inside of said collar, idle pinions carried by the collar meshing with both of said ring spur gears, a worm shaft rotatably carried by the forwardly projecting portion of said body, a pinion secured to said worm shaft meshing with the ring spur gear rotatably mounted on said body, a worm secured to the worm shaft meshing with the worm wheel on the pinion shaft, and manually operable means for clamping the worm wheel on said pinion shaft.

CHARLES TREE.

REFERENCES CITED

The following references are of record in the file of this patent:

UNITED STATES PATENTS

| Number | Name | Date |
| --- | --- | --- |
| 1,834,716 | Kis | Dec. 1, 1931 |
| 2,288,004 | Lauderdale | June 30, 1942 |
| 2,457,040 | Hall | Dec. 21, 1948 |